United States Patent
Eluru et al.

(10) Patent No.: US 10,266,756 B2
(45) Date of Patent: Apr. 23, 2019

(54) POROUS PROPPANTS

(71) Applicant: Halliburton Energy Services, Inc., Houston, TX (US)

(72) Inventors: Sairam Eluru, Maharashta (IN); Mallikarjuna Shroff Rama, Maharashta (IN); Sunil Garaje, Maharashta (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/551,014

(22) PCT Filed: Jun. 4, 2015

(86) PCT No.: PCT/US2015/034241
§ 371 (c)(1),
(2) Date: Aug. 14, 2017

(87) PCT Pub. No.: WO2016/195692
PCT Pub. Date: Dec. 8, 2016

(65) Prior Publication Data
US 2018/0030336 A1 Feb. 1, 2018

(51) Int. Cl.
*C09K 8/80* (2006.01)
*E21B 43/267* (2006.01)
(Continued)

(52) U.S. Cl.
CPC ............ *C09K 8/80* (2013.01); *C08G 73/1028* (2013.01); *C08G 73/1071* (2013.01); *C08J 9/28* (2013.01); *C09K 8/62* (2013.01); *E21B 43/267* (2013.01); *C08J 2205/026* (2013.01); *C08J 2379/08* (2013.01)

(58) Field of Classification Search
None
See application file for complete search history.

(56) References Cited

U.S. PATENT DOCUMENTS 8,974,903 B2  3/2015 Meador et al.
2008/0135245 A1  6/2008 Smith et al.
(Continued)

FOREIGN PATENT DOCUMENTS

WO  2007042939 A1  4/2007
WO  2013059793 A1  4/2013

OTHER PUBLICATIONS

Mary Ann B. Meador et al., Mechanically Strong, Flexible Polyimide Aerogels Cross-Linked with Aromatic Triamine, ACS Applied Materials & Interfaces 2012, 4, 536-544.
(Continued)

*Primary Examiner* — Angela M DiTrani Leff
(74) *Attorney, Agent, or Firm* — McAfee & Taft

(57) ABSTRACT

A treatment fluid and a plurality of proppant particles, which comprise a cross-linked polyimide aerogel, are provided for use in the fracking of subterranean formations. The cross-linked polyimide aerogel can have a porosity above about 80% and a compressive strength in the range from about 10,000 psi to about 50,000 psi. The cross-linked polyimide aerogel can be derived by cross-linking oligomers, wherein each oligomer comprises a base unit of one or more dianhydrides and one or more diamines.

16 Claims, 5 Drawing Sheets

(51) Int. Cl.
*C08G 73/10* (2006.01)
*C08J 9/28* (2006.01)
*C09K 8/62* (2006.01)

(56) References Cited

U.S. PATENT DOCUMENTS

| | | | |
|---|---|---|---|
| 2009/0038797 A1* | 2/2009 | Skala | C09K 8/80 |
| | | | 166/280.1 |
| 2009/0044942 A1 | 2/2009 | Gupta | |
| 2011/0118155 A1 | 5/2011 | Pisklak et al. | |
| 2014/0251623 A1* | 9/2014 | Lestz | E21B 43/26 |
| | | | 166/308.2 |
| 2014/0272358 A1* | 9/2014 | Meador | C08J 9/00 |
| | | | 428/219 |
| 2016/0137908 A1* | 5/2016 | Alwattari | C09K 8/805 |
| | | | 507/202 |

OTHER PUBLICATIONS

Nihal Arioglu, Evaluation of Ratio between Splitting Tensile Strength and Compressive Strength for Concretes up to 120 MPa and its Application in Strength Criterion, ACI Materials Journal Jan.-Feb. 2006.

Baochau N. Nguyen, Polyimide Cellulose Nanocrystal Composite Aerogels, NASA, Ohio Aerospace Institute, date unknown, www.nasa.gov.

* cited by examiner

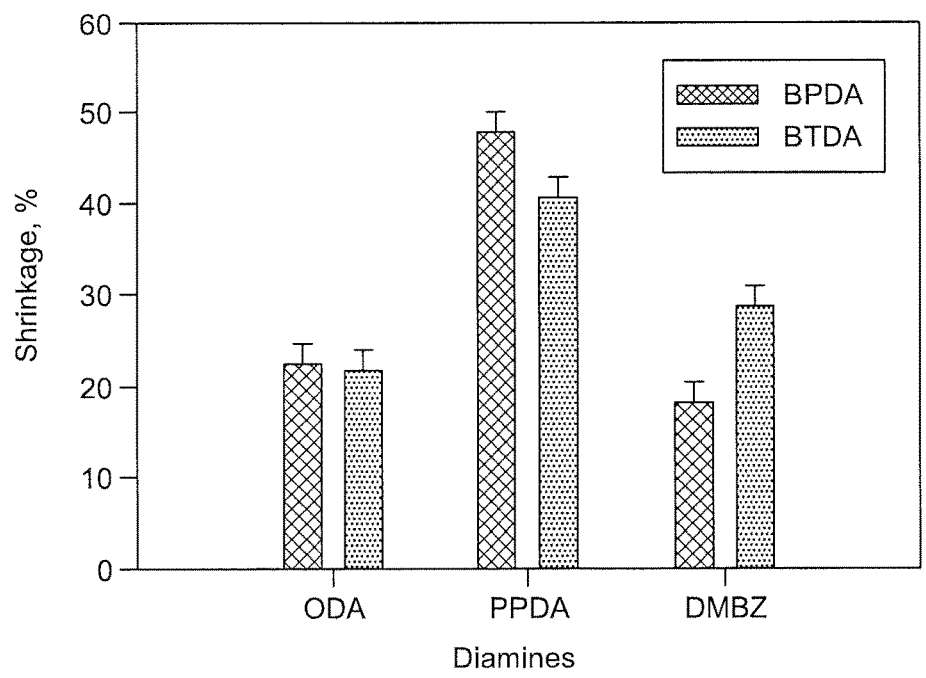
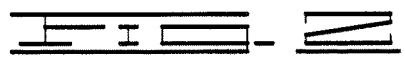
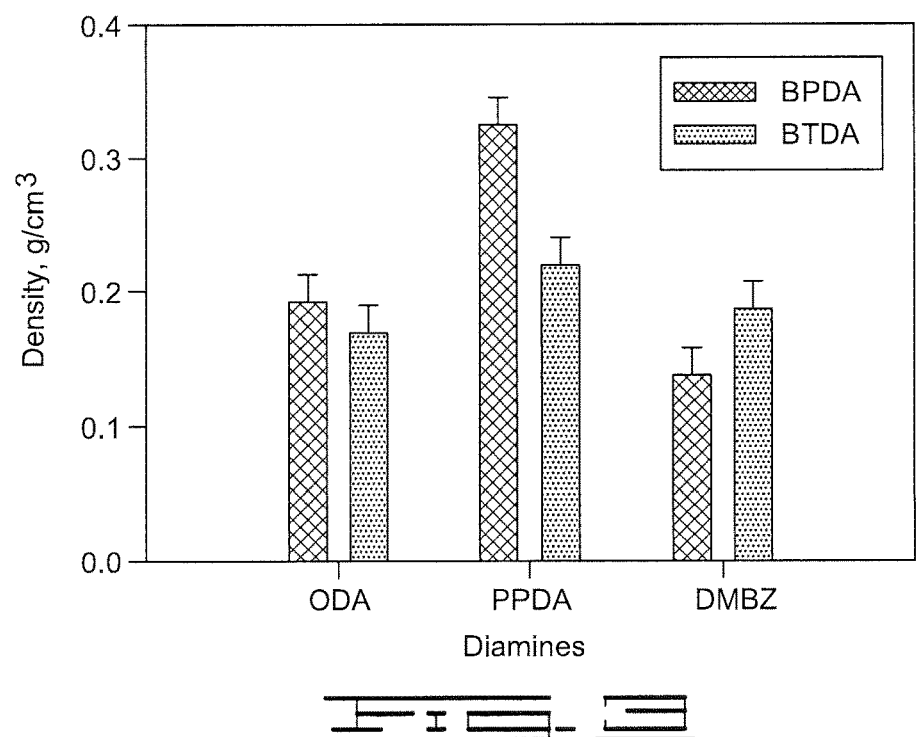
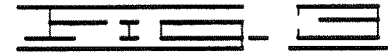

POROUS PROPPANTS

FIELD

This disclosure relates generally to systems and methods for fracturing operations in oil and gas reservoirs. More specifically, this disclosure relates to proppants and their use in fracturing operations.

BACKGROUND

In the process of acquiring oil and/or gas from a well, it is often necessary to stimulate the flow of hydrocarbons via hydraulic fracturing. The term "fracturing" refers to the method of pumping a fluid into a well until the pressure increases to a level that is sufficient to fracture the subterranean geological formations containing the entrapped materials. This process results in cracks and breaks that disrupt the underlying layer to allow the hydrocarbon product to be carried to the wellbore at a significantly higher rate. Unless the pressure is maintained, however, the newly formed openings close. In order to open a path and maintain it, a propping agent or "proppant" is injected along with the hydraulic fluid to create the support needed to preserve the opening. As the fissure is formed, the proppants are delivered in a slurry where, upon release of the hydraulic pressure, the proppants form a pack or a prop that serves to hold open the fractures.

To accomplish the placement of the proppants inside the fracture, these particles are suspended in a fluid that is then pumped to its subterranean destination. To prevent the particles from settling, a high viscosity fluid is often required to suspend them. The viscosity of the fluid is typically managed by addition of synthetic or naturally based polymers.

Two important properties of proppants are crush strength and density. High crush strength can be desirable for use in deeper fractures where pressures are greater, e.g., greater than about 2500 psi. As the relative strength of the various materials increases, so too have the respective particle densities. Unfortunately, higher density particles are more difficult to suspend in the fluid, generally, requiring increasing the viscosity of the fracturing fluid; however, at some point, increasing the viscosity of the fluid can be detrimental to the fracking process.

BRIEF DESCRIPTION OF THE DRAWINGS

FIG. 2 is a chart illustrating the shrinkage of six different polyimide aerogels.

FIG. 3 is a chart illustrating the density of six different polyimide aerogels.

DETAILED DESCRIPTION

Figure 1:
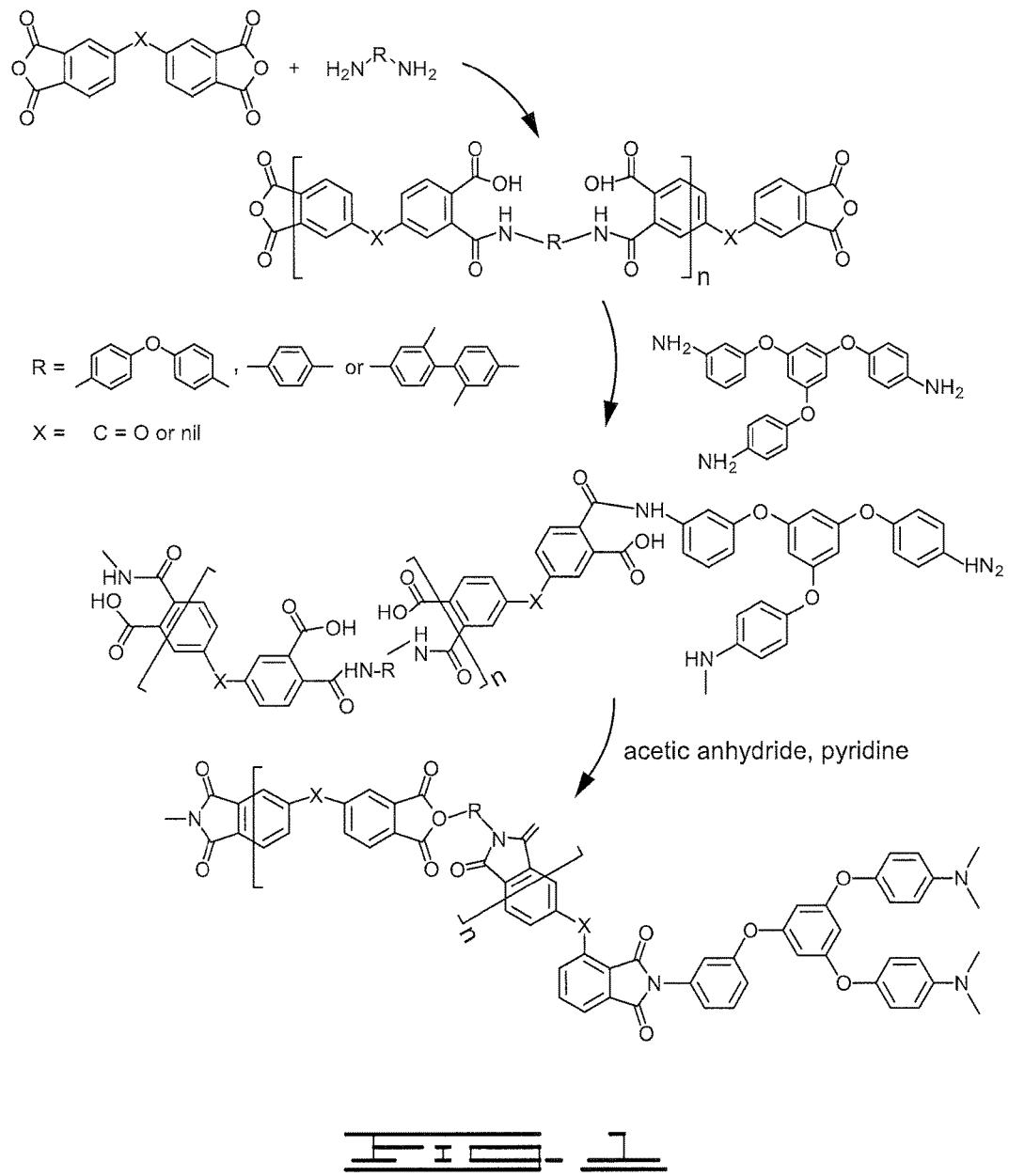
FIG. 1 illustrates the general synthesis route for polyimide aerogels cross-lined with 1,3,5-tri(4-aminophenoxy)benzene ("TAB").

The method and compositions disclosed herein are directed towards using porous and lightweight polymer based proppants with high compressive strength for fracturing. The methods and compositions are particularly useful in shale gas fracturing. In this case, the permeability and porosity of these proppants help in compensating the lost permeability incurred in proppant embedment in the shale rock. Also, the methods and compositions can be used in normal hydraulic fracturing without the need to cross-link the treatment fluid to carry the proppants as the disclosed proppants are light (less dense) compared to water.

In accordance with the above, there is provided a treatment fluid composition comprising a plurality of proppant particles. The proppant particles comprise a cross-linked polyimide aerogel and, for some embodiments, consist essentially of a cross-linked polymide aerogel.

The cross-linked polyimide aerogels useful as the current proppants are ones derived by cross-linking oligomers, wherein each oligomer comprises a base unit of one or more dianhydrides and one or more diamines. The oligomers can be cross-linked with a cross-linker selected from the group consisting of a triamine, an aliphatic triamine, an aromatic triamine, 1,3,5-tri(4-aminophenoxy)benzene ("TAB"), a silica cage structure (otherwise known as a silseqquioxane cage structure) decorated with three or more amines, octa (aminophenyl)silsesquioxane ("OAPS"), octa(aminophenyl)silsesquioxane as a mixture of isomers having the ration meta:ortho:para of 60:30:10, and para-octa(aminophenyl) silsesquioxane ("p-OAPS"). Generally, the cross-linker will be 1,3,5-tri(4-aminophenoxy)benzene ("TAB").

Typically, one or more dianhydride and one or more a diamine will be reacted to form an oligomer, such that the oligomer has a base unit comprising one or more diamines and one or more dianhydrides. While the base unit can form the entire oligomer, often the oligomer will comprise two or more such base units such that the oligomer comprises a repeating unit of a dianhydride and a diamine. A variety of dianhydrides and diamines can be used. For example, the diamines can be selected from the group consisting of 2,2'-bis[4-(4-aminophenoxy)phenyl]propane ("BAPP"), 3,4'-oxydianiline ("3,4'-ODA"), 4,4'-oxydianiline ("4,4'-ODA"), p-phenylene diamine ("PPDA"), 2,2'-dimethylbenzidine ("DMBZ"), bisaniline-p-xylidene ("BAX"), 4,4'-bis (4-aminophenoxy)biphenyl ("4,4'-BAPB"), 3,3'-bis(4-aminophenoxy)biphenyl ("3,3'-BAPB"), 4,4'-(1,4-phenylenediisopropylidene)bisaniline ("BisP"), and 4,4'-(1,3-phenylenediisopropylidene)bisaniline ("BisM"). Also for example, the dianhydrides can be selected from the group consisting of benzophenone-3,3',4,4'-tetracarboxylic dianhydride ("BTDA"), 2,2'-bis(3,4'-dicarboxyphenyl)hexafluoropropane dianhydride ("6FDA"), and biphenyl-3,3',4,4'-tetracarboxylic dianhydride ("BPDA"). More typically, the diamines can be selected from the group consisting of p-phenylene diamine ("PPDA"); 2,2'-dimethylbenzidine ("DMBZ"), and 4,4'-oxydianiline ("4,4'-ODA"); and the dianhydrides can be selected from the group consisting of benzophenone-3,3',4,4'-tetracarboxylic dianhydride ("BTDA"), and biphenyl-3,3',4,4'-tetracarboxylic dianhydride ("BPDA"). In one embodiment, the diamine is DMBZ and the dianhydride is BPDA.

Two or more dianhydrides and/or two or more diamines can also be used in combination. For example, a diamine known to produce a rigid backbone in polyimides in general, such as PPDA or DMBZ, can be used in combination with a diamine having flexible linking groups between phenyl rings, such as ODA, to tailor properties of the resulting porous cross-linked polyimide. Thus, for example, the diamine can comprise (i) ODA and (ii) PPDA or DMBZ. In accordance with this example, PPDA and ODA can be used in combination, such that the mole percent of PPDA can be varied from 0% to 100% of the total diamine, e.g. from about 20% to about 80%, about 30% to about 70%, about 40% to about 60%, or at about 50%, with the remaining diamine corresponding to ODA, e.g. from about 80% to about 20%, about 70% to about 30%, about 60% to about 40%/c, or at about 50%. Also in accordance with this example, DMBZ and ODA can be used in combination, such that the mole percent of DMBZ can be varied from 0% to 100% of the total diamine, e.g. from about 20% to about 80%, about 30% to about 70%, about 40% to about 60%, or at about 50%, with the remaining diamine corresponding to ODA, e.g. from about 80% to about 20%, about 70% to about 30%, about 60% to about 40%, or at about 50%.

The general synthesis route for polyimide aerogels are illustrated in FIG. 1. As can be seen from FIG. 1, dianhydrides and diamines are first combined to produce oligomers having the indicated dianhydride/diamine repeating unit. Next, the oligomer is cross-linked using a cross-linker, such as TAB. The resulting polymer then undergoes imidization so as to imidize the dianhydride/diamine repeating unit of the polymer to produce a cross-linked polyimide aerogel. While in some cases thermal imidization can be used, generally the imidization will be chemical imidization. Conditions suitable for the chemical imidization are known in the art.

The base unit can be chemically imidized to yield the porous cross-linked polyimide. The chemical imidization can be carried out, for example, by use of an imidization catalyst. The imidization catalyst can comprise, for example, acetic anhydride and pyridine. The base unit can be chemically imidized to completion, e.g. all of the amic acid groups of each repeating unit of the oligomers of the subunit can have reacted, e.g. intra-molecularly, to yield imide units. The subunit also can be chemically imidized without using thermal imidization, e.g. without using an increase in temperature during imidization in order to increase the rate of imidization. For example, the subunit can be chemically imidized at a temperature below 100° C., e.g. below 80° C., below 60° C., or below 40° C. Also for example, the subunit can be chemically imidized at room temperature, e.g. at 15° C. to 25° C., 18° C. to 22° C., or 20° C. By first cross-linking the subunit to form a cross-linked gel, followed by chemically imidizing the subunit, the porous cross-linked polyimide is formed.

In addition to the above-described synthesis, a diamine can be first reacted with a diisocryanate to form a diamine-urea linkage-diamine group, followed by reaction of the diamine-urea linkage-diamine group with a dianhydride and a diamine a subunit. The subunit is cross-linked via a cross-linking agent, comprising three or more amine groups, and imidizing to form a porous cross-linked polyimide-urea network is formed. The process for this synthesis is further described in U.S. Patent Publication 2014/0272358 A1.

Cross-linked polyimide aerogels are especially useful as proppants because the aerogels can be selected with widely different porosity. Porosity is a measure of the void (i.e., "empty") spaces in a material, and is a fraction of the volume of voids over the total volume, between 0 and 1, or as a percentage between 0 and 100%. Greater porosity for the cross-linked polyimide aerogel equates to less density so that the proppants can be suspended without settling down in the base fluid independent of base fluid's viscosity and time. Additionally, selection of appropriate porosity allows for fine tuning the density such that the suspension is vertically uniform throughout the fracture opening. Further, greater porosity represents greater hydraulic conductivity, which can be especially useful in a fracking proppant material so that the proppant does not block the flow of oil or gas through the fracture created.

Generally, cross-linked polyimide aerogels can have a porosity from 0% to less than 100%. Accordingly, the cross-linked polyimide aerogel selected as the proppant can be selected with a porosity resulting in a density desired to keep the proppant suspended in the base fluid used for treating the subterranean formation. Further, two or more aerogels of differing porosity can be selected to form proppants having different densities so that the suspended proppants are vertically uniform throughout the fracture opening in the subterranean formation. For many proppant uses, such as use in a base fluid without viscosifiers, the cross-linked polyimide aerogel selected typically can have a porosity above about 80%, above about 85% or from about 88% to about 92%.

Additionally, the cross-linked polyimide aerogel is selected so that it has a relatively high compressive strength, generally above about 2500 psi, more typically above about 5000 psi, above 10,000 psi or above 13,000 psi. Generally, the compressive strength of the selected aerogel will be in the range from about 2500 psi to about 50,000 psi but can be selected to have a compressive strength in the range from about 5000 psi to about 50,000 psi, from about 10,000 psi to about 50,000 psi, about 13,000 psi to about 40,000 psi or from about 13,200 psi to about 39,600 psi. Such relatively high compressive strength enables the proppant to resist compressive forces in the fractures in which the proppant is lodged, thus insure that the fracture remains open and conductive.

Also, the use of cross-linked polyimide aerogels as proppants has the advantage of the aerogels having a density less than water, thus alleviating the need for gelling of the treatment fluid and making the aerogel suitable for use with less viscous treatment fluids like foams. For example, the aerogel proppants can have a density of from about 0.09 g/cm$^3$ to about 0.40 g/cm$^3$, from about 0.12 g/cm$^3$ to about 0.25 g/cm$^3$, or from about 0.18 g/cm$^3$ to about 0.22 g/cm$^3$.

FIGS. 2-5 illustrate the properties of various cross-linked polyimide aerogels. FIG. 2 illustrates the average shrinkage during processing for six different cross-linked polyimide aerogels: ODA/BPDA aerogel, ODA/BTDA aerogel, PPDA/BPDA aerogel, PPDA/BTDA, DMBZ/BPDA aerogel and DMBZ/BTDA aerogel. Low shrinkage is preferable because high shrinkage generally results in a denser proppant particle that is less conductive in the fracture.

Figure 4:
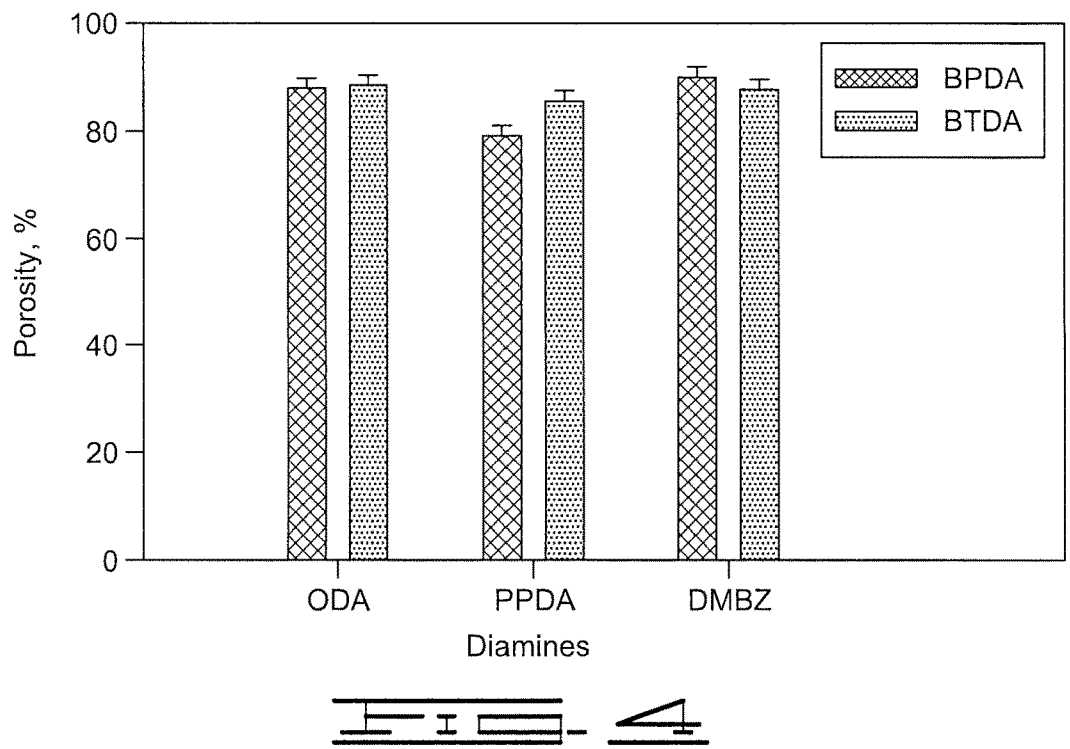
FIG. 4 is a chart illustrating the porosity of six different polyimide aerogels.
Figure 5:
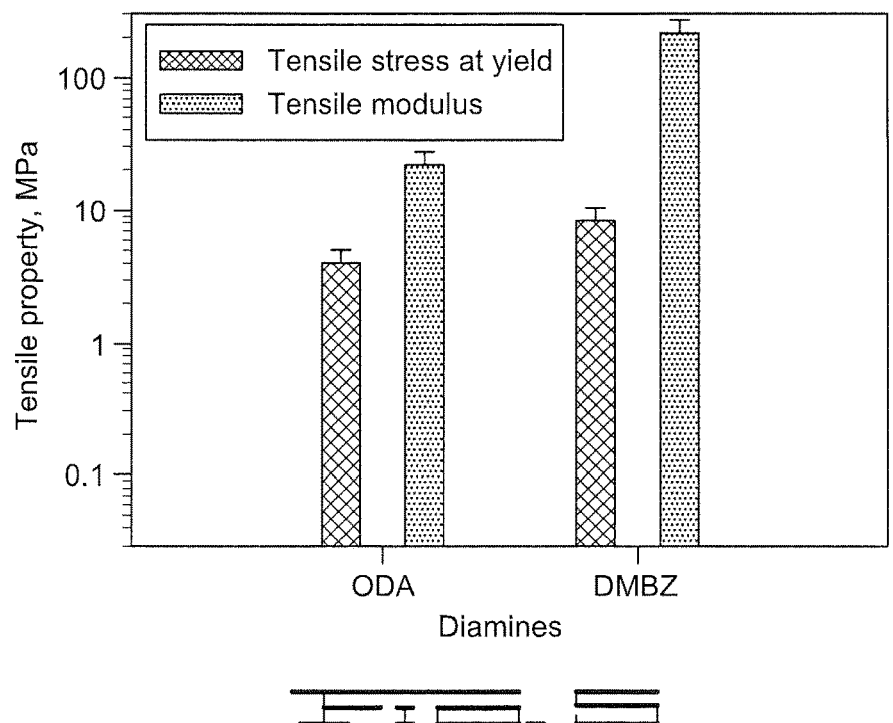
FIG. 5 is a chart illustrating the tensile stress of two different polyimide aerogels.

FIG. 3 illustrates the density for each of the six cross-linked polyimide aerogels. As can be seen the densities are all in the range of from about 0.09 g/cm$^3$ to about 0.40 g/cm$^3$; however, based on their lower densities, the aerogels with ODA diamines and DMBZ diamines are more preferred as proppants. FIG. 4 illustrates the porosity for each of the six cross-linked polyimide aerogels. All six aerogels have a porosity above about 80%. FIG. 5 illustrates the tensile stress at yield and the tensile modulus for ODA/BPDA aerogel and DMBZ/BPDA aerogel. As can be seen, DMBZ/BPDA aerogel has a tensile strength of 9 MPa, which corresponds to a compressive strength in the range of 13,200 psi to 39,600 psi.

For use in fracking operations, the above-described proppant will generally be mixed into a treatment fluid. The treatment fluid can comprise one or more of a base fluid, a gelling agent, a cross-linker, a gel breaker, and other non-proppant additives. The base fluid can be selected from the group consisting of oil-based fluids, aqueous-based fluids, aqueous-miscible fluids, water-in-oil emulsions, oil-in-water emulsions, or gelled foams. The gelling agent and cross-linker can be any suitable ones known in the art and are designed to increase the viscosity of the base fluid. The additives referred herein are non-viscosifying additives; that is, additives which have a primary purpose that is other than increasing the viscosity of the base fluid. The additives include salts, pH control additives, surfactants, bactericides, fluid loss control additives, stabilizers, chelants, scale inhibitors, paraffin inhibitors, asphaltene inhibitors, mutual solvents, solvents, corrosion inhibitors, hydrate inhibitors, foaming agents, clay stabilizers, relative permeability modifiers (such as HPT-1™ chemical additive available from Halliburton Energy Services, Duncan, Okla., which is a hydrophobically modified hydrophilic polymer containing alkyldimethylammoniumethyl methacrylate halide units), sulfide scavengers, fibers, nanoparticles, consolidating agents (such as resins and/or tackifiers), combinations thereof, or the like.

It is a benefit of the current aerogel proppants that they are less dense than the base fluid. Accordingly, in many embodiments the treatment fluid will comprise a base fluid and additives and will not contain any viscosifying agents or breakers. As used herein, "viscosifying agents" means agents or compounds whose primary purpose is to increase the viscosity of the base fluid or agents that increase the viscosity by more than 10%. For example, gelling agents and cross-linkers are viscosifying agents. Accordingly, in many embodiments, the base fluid is not gelled and such a base fluid will be referred to as a non-gelled based fluid.

As mentioned above, the base fluid can be oil-based fluids, aqueous-based fluids, aqueous-miscible fluids, water-in-oil emulsions, or oil-in-water emulsions. Additionally, the base fluid may be foamed such as by the addition of foaming agents. Generally, the base fluid will be an aqueous-based fluid used as a liquid or a foam but not gelled. Aqueous-based fluids include fresh water, saltwater (e.g., water containing one or more salts dissolved therein), brine (e.g., saturated salt water), formation brine, seawater, or any other aqueous fluid that, preferably, does not adversely interact with the other components used in accordance with this invention or with the subterranean formation. As used herein, the term "foam" refers to a two-phase composition having a continuous liquid phase and a discontinuous gas phase. In some embodiments, treatment fluids for use in conjunction with the present invention may comprise a base fluid, a gas, and a foaming agent.

Suitable gases for use in conjunction with the present invention may include, but are not limited to, nitrogen, carbon dioxide, air, methane, helium, argon, ammonia, petroleum gases and any combinations thereof. Petroleum gases will typically be ethane, propane, butane pentane and the like and can be introduced into the treatment fluid at the surface as a liquefied petroleum. One skilled in the art, with the benefit of this disclosure, will recognize the benefit of each gas. By way of non-limiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate or proppant transport capability, if necessary, up to about 12 lbs. of proppant per gallon of fracture fluid.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the present invention may include, but are not limited to, cationic foaming agents, anionic foaming agents, amphoteric foaming agents, nonionic foaming agents, or any combination thereof. Non-limiting examples of suitable foaming agents may include, but are not limited to, surfactants like betaines; sulfated or sulfonated alkoxylates; alkyl quarternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivatives thereof; or any combinations thereof. Foaming agents may be included in foamed treatment fluids at concentrations ranging typically from about 0.05% to about 2% of the liquid component by weight (e.g., from about 0.5 to about 20 gallons per 1000 gallons of liquid).

The treatment fluid containing the proppant can be used in the fracturing of a subterranean formation penetrated by a wellbore. In such a fracking method, a first treatment fluid is pumped into a portion of a subterranean formation at a rate and pressure sufficient to create or enhance fractures in the formation or to open up existing fractures. The first treatment fluid can contain proppants such that concurrently with the fracturing fluid, the proppants are pumped through the wellbore and carried by the treatment fluid into the subterranean formation. Alternatively, the proppants can be subsequently introduced into the subterranean formation by a second treatment fluid after the first treatment fluid has created, enhanced and/or opened fractures. The pressure of the treatment fluid carrying the proppants can be such that that the fractures previously opened in the subterranean formation remain open and cause the proppant to migrate into the fractures in the subterranean formation. A treatment fluid can carry the proppants under high pressure into the subterranean formation while the fractures remain open. When the pressure of the fluid carrying the proppant is reduced, the fractures in the subterranean formation partially close but are also kept at least partially open by the proppants.

By preventing the fractures from fully closing, the proppant improves the conductivity of the subterranean formation. As previously mentioned, the current aerogel proppants are highly porous and this porosity further improves the conductivity of the subterranean formation.

Figure 6:
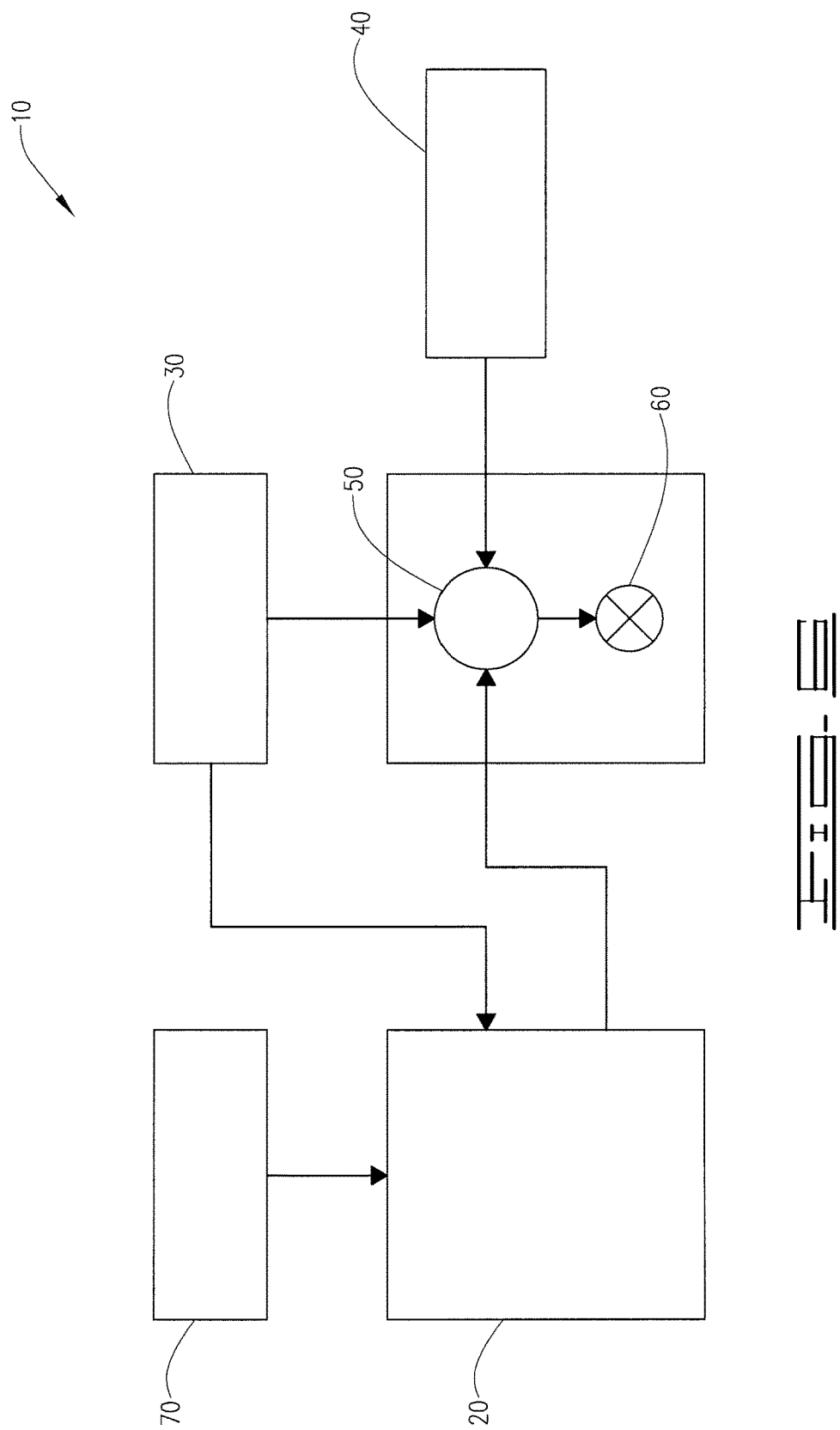
FIG. 6 is a diagram illustrating an example of a fracturing system that may be used in accordance with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 6, the disclosed methods and compositions may directly or indirectly affect one or more components or pieces of equipment associated with an exemplary fracturing system 10, according to one or more embodiments. In certain instances, the system 10 includes a fracturing fluid (treatment fluid) producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor (or gelling agent) with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include the current proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 7:
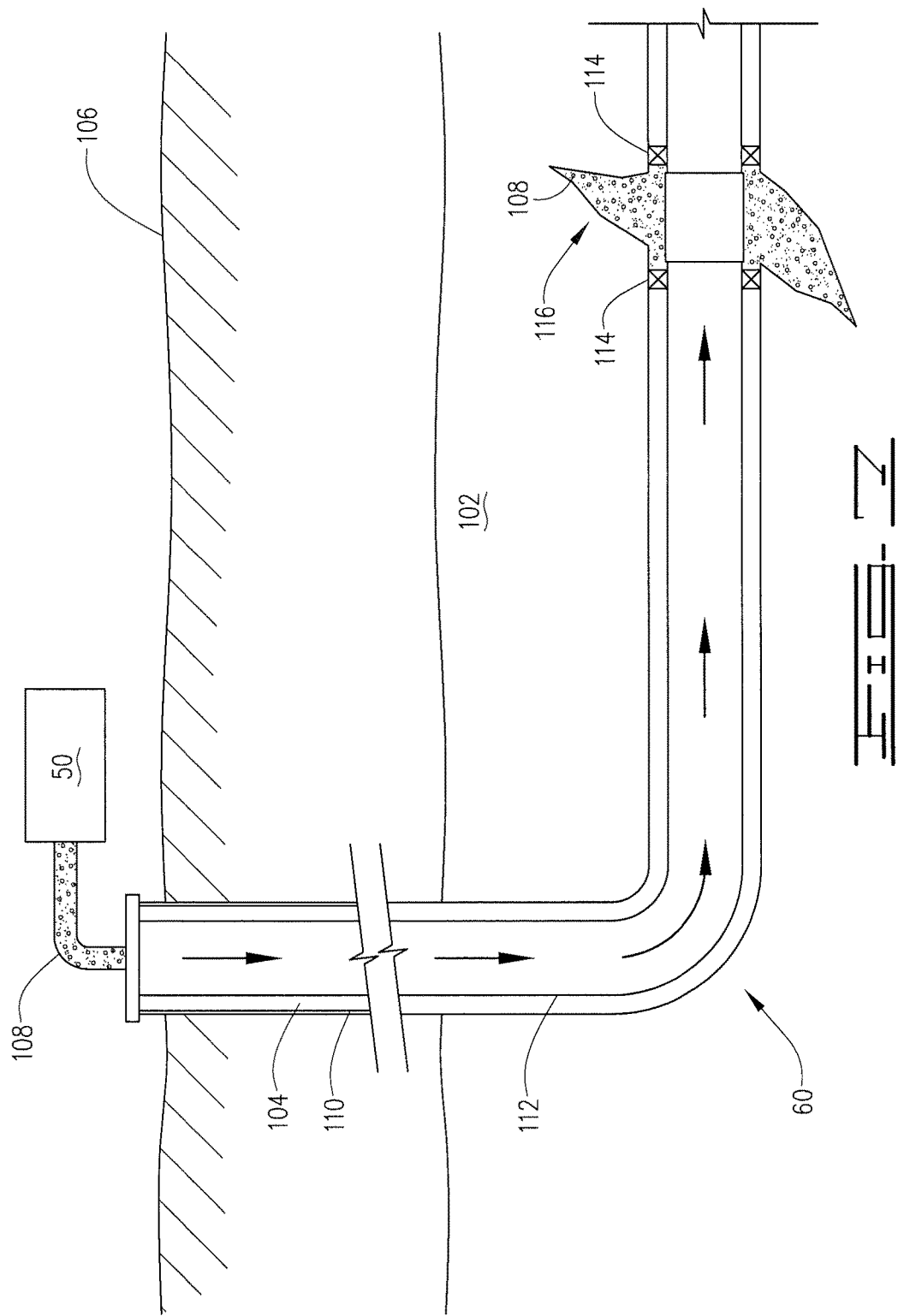
FIG. 7 is a diagram illustrating an example of a subterranean formation in which a fracturing operation may be performed in accordance with certain embodiments of the present disclosure.

FIG. 7 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled with a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and/or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 7 shows two packers 114, one defining an uphole boundary of the interval and one defining the downhole end of the interval. When the fracturing fluid 108 is introduced into wellbore 104 (e.g., in FIG. 7, the area of the wellbore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another; any pumps, compressors, or motors used to drive the compositions into motion; any valves or related joints used to regulate the pressure or flow rate of the compositions; and any sensors (i.e., pressure and temperature), gauges, and/or combinations thereof, and the like.

Exemplary embodiments that are in accordance with the above description include a composition comprising a treatment fluid and a plurality of proppant particles, which comprise a cross-linked polyimide aerogel. For some aspects, the proppant particles can consist essentially of a cross-linked polymide aerogel. In other aspects, the composition can consist essentially of the treatment fluid and the plurality of proppant particles, wherein the treatment fluid is a non-gelled base fluid. The non-gelled based fluid can include additives but does not include viscosifiers. In some embodiments, the non-gelled based fluid is an aqueous-based fluid and can be foamed.

In some embodiments, the cross-linked polyimide aerogel has a porosity of from about 0% to about 100% or from greater than 0% to less than 100%. Often embodiments will use a cross-linked polyimide with a porosity above about 80% and a compressive strength in the range from about 2500 psi to about 50,000 psi, from about 5000 psi to about 50,000 psi, or from about 10,000 psi to about 50,000 psi. In other embodiments, the cross-linked polyimide aerogel has a porosity of above about 85% and has a compressive strength in the range from about 13,000 psi to about 40,000 psi. In further embodiments, the cross-linked polyimide aerogel has a porosity from about 88% to about 92%, a density from about 0.18 g/cm³ to about 0.22 g/cm³ and a compressive strength in the range from about 13,200 psi to about 39,600 psi.

The cross-linked polyimide aerogel can be derived by cross-linking oligomers, wherein each oligomer comprises a base unit of one or more dianhydrides and one or more diamines. The oligomers can be cross-linked with 1,3,5-tri (4-aminophenoxy)benzene.

The diamines can be selected from the group consisting of 2,2'-bis[4-(4-aminophenoxy)phenyl]propane ("BAPP"), 3,4'-oxydianiline ("3,4'-ODA"), 4,4'-oxydianiline ("4,4'-ODA"), p-phenylene diamine ("PPDA"), 2,2'-dimethylbenzidine ("DMBZ"), bisaniline-p-xylidene ("BAX"), 4,4'-bis(4-aminophenoxy)biphenyl ("4,4'-BAPB"), 3,3'-bis(4-aminophenoxy)biphenyl ("3,3'-BAPB"), 4,4'-(1,4-phenylenediisopropylidene)bisaniline ("BisP"), and 4,4'-(1,3-phenylenediisopropylidene)bisaniline ("BisM"). The dianhydrides can be selected from the group consisting of benzophenone-3,3',4,4'-tetracarboxylic dianhydride ("BTDA"), 2,2'-bis(3,4'-dicarboxyphenyl)hexafluoropropane dianhydride ("6FDA"), and biphenyl-3,3',4,4'-tetracarboxylic dianhydride ("BPDA").

In some embodiments, the diamines are selected from the group consisting of p-phenylene diamine ("PPDA"); 2,2'-dimethylbenzidine ("DMBZ"), and 4,4'-oxydianiline ("4,4'-ODA"); and the dianhydrides are selected from the group consisting of benzophenone-3,3',4,4'-tetracarboxylic dianhydride ("BTDA"), and biphenyl-3,3',4,4'-tetracarboxylic dianhydride ("BPDA"). In one embodiment, the cross-linked polyimide aerogel is a DMBZ/BPDA polyimide aerogel.

Other exemplary embodiments include a method wherein the above described cross-linked polyimide aerogels are made by the steps of:

reacting a dianhydride and a diamine to form an oligomer having a base unit comprising one or more diamines and one or more dianhydrides;

cross-linking the oligomer to from a polymer; and imidizing the polymer to produce a cross-linked polyimide aerogel.

Still other exemplary embodiments include a method of fracturing a subterranean formation penetrated by a wellbore, the method comprising:

providing a treatment fluid comprising a plurality of proppant particles, wherein the proppant particles comprise one or more of the above described cross-linked polyimide aerogels; and introducing the treatment fluid into the wellbore at or above a pressure sufficient to create or enhance at least one fracture in the subterranean formation.

In the method, the treatment fluid can be introduced into the wellbore by a pump such that the pressure is sufficient to create or enhance at least one fracture in the subterranean formation. Also, in some embodiments the proppant particles consist essentially of one or more of the above-described cross-linked polyimide aerogels.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention.

While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of fracturing a subterranean formation penetrated by a wellbore, the method comprising:

providing a treatment fluid comprising a plurality of proppant particles, wherein the proppant particles comprise a cross-linked polyimide aerogel, wherein the cross-linked polyimide aerogel is derived by cross-linking oligomers, wherein each oligomer comprises a base unit of one or more dianhydrides and one or more diamines, and wherein the cross-linked polyimide aerogel has a porosity of above about 80% and has a compressive strength in the range from about 2500 psi to about 50,000 psi; and introducing the treatment fluid into the wellbore at or above a pressure sufficient to create or enhance at least one fracture in the subterranean formation.

2. The method of claim 1, wherein:

the diamines are selected from the group consisting of 2,2'-bis[4-(4-aminophenoxy)phenyl]propane ("BAPP"), 3,4'-oxydianiline ("3,4'-ODA"), 4,4'-oxydianiline ("4,4'-ODA"), p-phenylene diamine ("PPDA"), 2,2'-dimethylbenzidine ("DMBZ"), bisaniline-p-xylidene ("BAX"), 4,4'-bis(4-aminophenoxy)biphenyl ("4,4'-BAPB"), 3,3'-bis(4-aminophenoxy)biphenyl ("3,3'-BAPB"), 4,4'-(1,4-phenylenediisopropylidene)bisaniline ("BisP"), and 4,4'-(1,3-phenylenediisopropylidene)bisaniline ("BisM"); and the dianhydrides are selected from the group consisting of benzophenone-3,3',4,4'-tetracarboxylic dianhydride ("BTDA"), 2,2'-bis(3,4'-dicarboxyphenyl)hexafluoropropane dianhydride ("6FDA"), and biphenyl-3,3',4,4'-tetracarboxylic dianhydride ("BPDA").

3. The method of claim 2, wherein:

the diamines are selected from the group consisting of p-phenylene diamine ("PPDA"); 2,2'-dimethylbenzidine ("DMBZ"), and 4,4'-oxydianiline ("4,4'-ODA");

the dianhydrides are selected from the group consisting of benzophenone-3,3',4,4'-tetracarboxylic dianhydride ("BTDA"), and biphenyl-3,3',4,4'-tetracarboxylic dianhydride ("BPDA"); and the oligomers are cross-linked with 1,3,5-tri(4-aminophenoxy)benzene.

4. The method of claim 3, wherein the cross-linked polyimide aerogel is a DMBZ/BPDA polyimide aerogel.

5. The method of claim 4, wherein the cross-linked polyimide aerogel has a porosity from about 88% to about 92%, a density from about 0.18 g/cm³ to about 0.22 g/cm³ and a compressive strength in the range from about 13,200 psi to about 39,600 psi.

6. The method of claim 1, wherein the cross-linked polyimide aerogel is made by the steps of:
   reacting a dianhydride and a diamine to form an oligomer having a base unit comprising one or more diamines and one or more dianhydrides;
   cross-linking the oligomer to from a polymer; and
   imidizing the polymer to produce the cross-linked polyimide aerogel.

7. The method of claim 6, wherein:
   the diamine is selected from the group consisting of 2,2'-bis[4-(4-aminophenoxy)phenyl]propane ("BAPP"), 3,4'-oxydianiline ("3,4'-ODA"), 4,4'-oxydianiline ("4,4'-ODA"), p-phenylene diamine ("PPDA"), 2,2'-dimethylbenzidine ("DMBZ"), bisaniline-p-xylidene ("BAX"), 4,4'-bis(4-aminophenoxy)biphenyl ("4,4'-BAPB"), 3,3'-bis(4-aminophenoxy)biphenyl ("3,3'-BAPB"), 4,4'-(1,4-phenylenediisopropylidene)bisaniline ("BisP"), and 4,4'-(1,3-phenylenediisopropylidene)bisaniline ("BisM"); and
   the dianhydrides are selected from the group consisting of benzophenone-3,3',4,4'-tetracarboxylic dianhydride ("BTDA"), 2,2'-bis(3,4'-dicarboxyphenyl)hexafluoropropane dianhydride ("6FDA"), and biphenyl-3,3',4,4'-tetracarboxylic dianhydride ("BPDA").

8. The method of claim 7, wherein the cross-linked polyimide aerogel has a porosity above about 88%, a density from about 0.09 g/cm³ to about 0.40 g/cm³ and a compressive strength in the range from about 13,200 psi to about 39,600 psi.

9. The method of claim 8, wherein the treatment fluid is introduced into the wellbore by a pump such that the pressure is sufficient to create or enhance at least one fracture in the subterranean formation.

10. The method of claim 9, wherein:
   the diamine is selected from the group consisting of p-phenylene diamine ("PPDA"); 2,2'-dimethylbenzidine ("DMBZ"), and 4,4'-oxydianiline ("4,4'-ODA"); and
   the dianhydrides are selected from the group consisting of benzophenone-3,3',4,4'-tetracarboxylic dianhydride ("BTDA"), and biphenyl-3,3',4,4'-tetracarboxylic dianhydride ("BPDA").

11. The method of claim 10, wherein oligomers are cross-linked with 1,3,5-tri(4-aminophenoxy)benzene.

12. The method of claim 11, wherein the cross-linked polyimide aerogel is a DMBZ/BPDA polyimide aerogel.

13. A composition comprising:
   a treatment fluid; and
   a plurality of proppant particles, which comprise a cross-linked polyimide aerogel having a porosity of above about 80% and has a compressive strength in the range from about 10,000 psi to about 50,000 psi, and wherein the cross-linked polyimide aerogel is derived by cross-linking oligomers, wherein each oligomer comprises a base unit of one or more dianhydrides and one or more diamines.

14. The composition of claim 13, wherein:
   the diamines are selected from the group consisting of 2,2'-bis[4-(4-aminophenoxy)phenyl]propane ("BAPP"), 3,4'-oxydianiline ("3,4'-ODA"), 4,4'-oxydianiline ("4,4'-ODA"), p-phenylene diamine ("PPDA"), 2,2'-dimethylbenzidine ("DMBZ"), bisaniline-p-xylidene ("BAX"), 4,4'-bis(4-aminophenoxy)biphenyl ("4,4'-BAPB"), 3,3'-bis(4-aminophenoxy)biphenyl ("3,3'-BAPB"), 4,4'-(1,4-phenylenediisopropylidene)bisaniline ("BisP"), and 4,4'-(1,3-phenylenediisopropylidene)bisaniline ("BisM"); and
   the dianhydrides are selected from the group consisting of benzophenone-3,3',4,4'-tetracarboxylic dianhydride ("BTDA"), 2,2'-bis(3,4'-dicarboxyphenyl)hexafluoropropane dianhydride ("6FDA"), and biphenyl-3,3',4,4'-tetracarboxylic dianhydride ("BPDA").

15. The composition of claim 14, wherein:
   the diamines are selected from the group consisting of p-phenylene diamine ("PPDA"); 2,2'-dimethylbenzidine ("DMBZ"), and 4,4'-oxydianiline ("4,4'-ODA"); and
   the dianhydrides are selected from the group consisting of benzophenone-3,3',4,4'-tetracarboxylic dianhydride ("BTDA"), and biphenyl-3,3',4,4'-tetracarboxylic dianhydride ("BPDA").

16. The composition of claim 15, wherein the cross-linked polyimide aerogel is a DMBZ/BPDA polyimide aerogel.

* * * * *